United States Patent [19]

McClelland

[11] 4,114,239

[45] Sep. 19, 1978

[54] METHOD AND APPARATUS FOR QUIETING A FOWL EVISCERATING DEVICE

[76] Inventor: Keener D. McClelland, 110 Southampton Rd., Hattiesburg, Miss. 39401

[21] Appl. No.: 774,478

[22] Filed: Mar. 4, 1977

[51] Int. Cl.$^2$ ............................................. A22C 21/00
[52] U.S. Cl. ............................................. 17/45; 17/11
[58] Field of Search ............... 17/11, 45; 15/326, 421; 141/65

[56] References Cited

U.S. PATENT DOCUMENTS

| | | | |
|---|---|---|---|
| 2,590,785 | 3/1952 | Nealy | 17/11 |
| 2,654,557 | 10/1953 | Henderson | 141/65 |
| 3,137,031 | 6/1964 | Ine | 17/11 |
| 3,203,663 | 8/1965 | Basham et al. | 17/11 |
| 3,451,097 | 6/1969 | Knight | 17/11 |
| 3,526,018 | 9/1970 | Lovitt | 17/11 |
| 3,744,750 | 7/1973 | Chamberlain | 17/11 |
| 3,777,330 | 12/1973 | Van Huffel | 15/421 |
| 3,921,255 | 11/1975 | LaBarber | 17/11 |

*Primary Examiner*—Louis G. Mancene
*Assistant Examiner*—Paul J. Hirsch
*Attorney, Agent, or Firm*—Wilkinson, Mawhinney & Theibault

[57] ABSTRACT

The present disclosure is directed to a method and apparatus for removal of the lungs and/or trachea from a previously eviscerated fowl in which a vacuum tube and an ambient air tube joined together at their entrance end has a truncated cone-like sealing means secured in airtight relationship proximate the fowl insertion end and in which the sealing means and tubes are inserted into the posterior opening of a previously eviscerated fowl and the vacuum tube is selectively inserted into the body cavity and placed in communication with the vacuum source to suck the lungs and/or trachea from the fowl while admitting ambient air into the carcass cavity to reduce the noise level while maintaining an air seal between the apparatus and the resonant cavity within the carcass of the fowl to render the area relatively quiet in which human operators must operate the apparatus.

8 Claims, 11 Drawing Figures

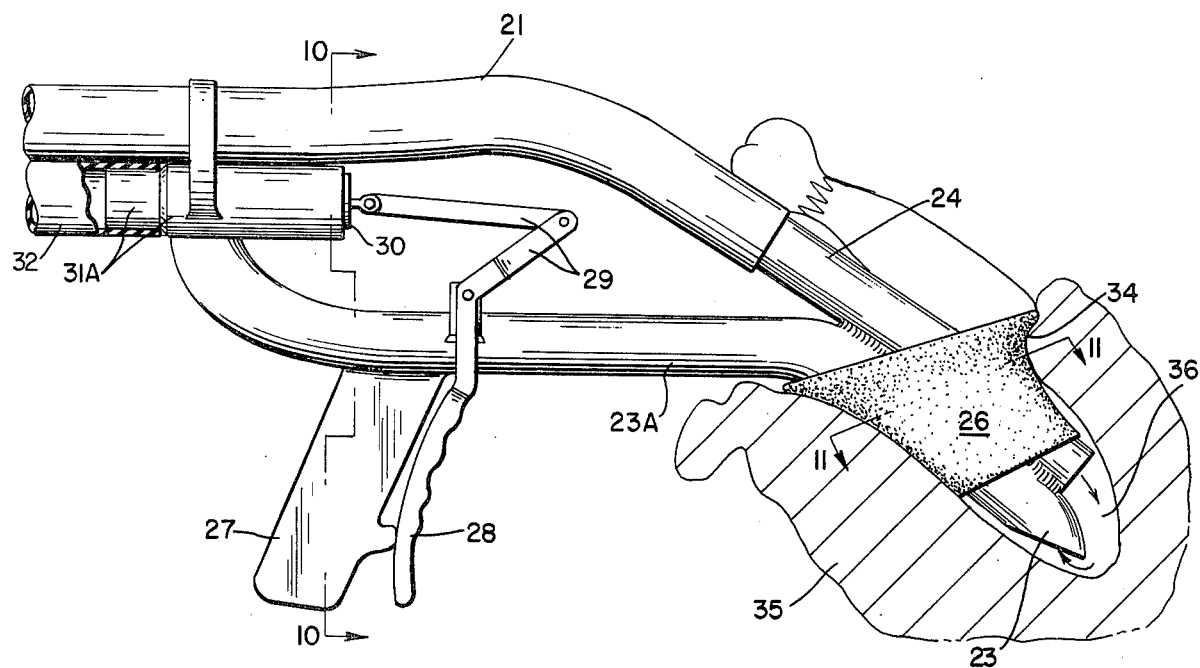
FIG. 8
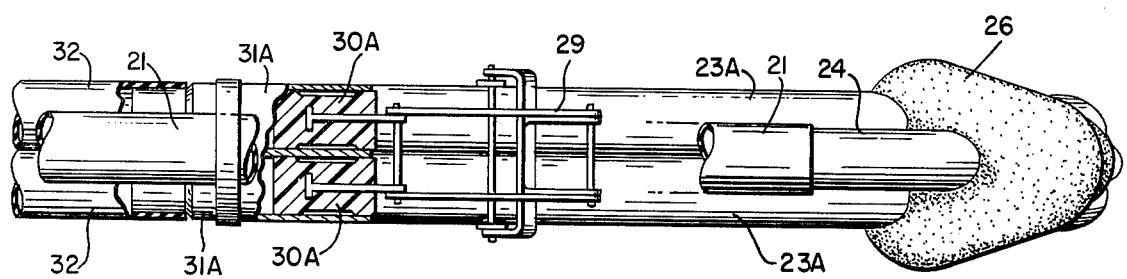
FIG. 9
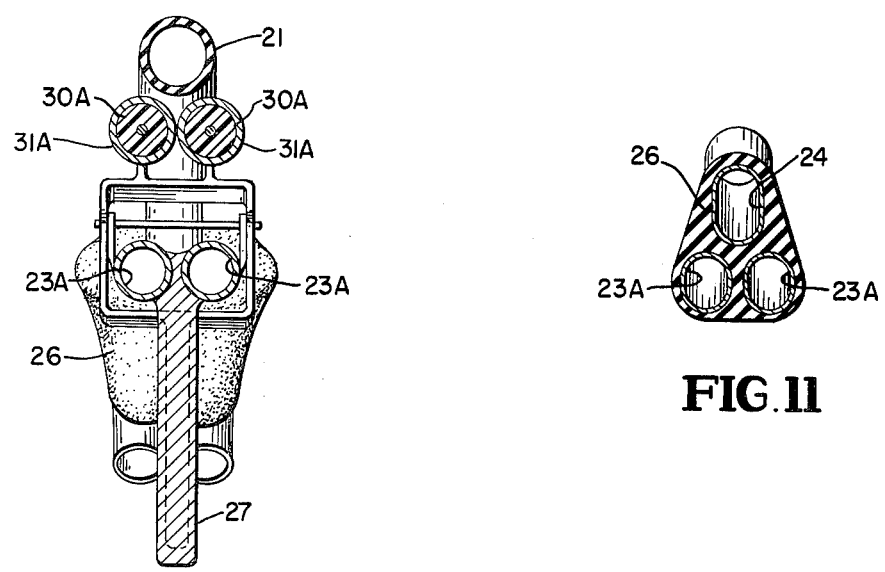
FIG. 10
FIG. 11

METHOD AND APPARATUS FOR QUIETING A FOWL EVISCERATING DEVICE

BACKGROUND OF THE INVENTION

The present invention is to reduce the sound energy emanating from the interaction of the eviscerating device with the viscera, lungs and other contents of the body cavity of poultry and the like during the process of evisceration. This is done by confining the undesirably high noise level to the interior of the carcass. The primary pathway by which sound escapes to the surrounding area is through the posterior opening of the fowl around the eviscerating tool or lung removal device. Noise produced by operation of these devices results primarily from three sources. One source is the high velocity turbulent air flow through the narrow opening between the vacuum nozzle of the device and the body tissue. Another noise source is the vibration of tissues resulting from the Bernoulli effect (reduced pressure in the region of high velocity air flow). The third source of noise is turbulent flow of air entering the body cavity of the fowl to replace air being removed by the vacuum nozzle. Bernoulli effect and consequent tissue vibration occurs near the point of contact between the mouth of the vacuum nozzle and the tissue being removed and at the opening of the body cavity between the tissue at the margin of the opening and the barrel of the eviscerating device.

An object of the present invention relates to a process for sealing the posterior opening of the fowl during the suction process to prevent the escape of undesirable noise. The sealing process is accomplished by introducing a cone-like structure formed in such a way as to seal the opening while permitting the vacuum nozzle to reach tissue to be removed from the body cavity. The instrument permits successful sealing and tissue removal from poultry and the like varying greatly in size and weight. Size flexibility is accomplished by increasing the perimeter of the cone-like structure at the point of contact with the posterior opening of the fowl in proportion to the increasing depth to which the vacuum nozzle must reach as fowl size increases.

Another object of the present invention is the introduction of air into the body cavity of the fowl to replace air being drawn out by the vacuum process. This air, introduced at atmospheric pressure, is routed into the cavity through a nozzle adjacent to and attached to the vacuum nozzle. The source of the replacement air is a large air reservoir at atmospheric pressure to ensure adequate volume of replacement air flow while ensuring that noise generated by the air flow does not reach the work area outside of and surrounding the fowl being worked upon.

The features of the noise reducing method which are unique are that of providing a seal between the cone-like attachment and the tissue at the posterior opening of the fowl and the provision of a supply of air at a rate and in a quantity sufficient to replace the air removed by the suction process. Although air injection has been a feature of other eviscerating devices and methods, the purpose of injected high-pressure, high-velocity air in these cases has been to dislodge tissue to be removed and not to replace air drawn out by the vacuum, as in the present case.

With the foregoing and other objects in view the invention will be more fully described hereinafter and more particularly pointed out in the appended claims.

In the drawings in which like parts are denoted by reference characters throughout the several views:

FIG. 8 is a side elevational view of a modified form of apparatus constructed in accordance with the present invention shown inserted in a fowl.

FIG. 9 is a top plan view of a modified form of apparatus for practicing the method of the present invention for removal of both the left and right lungs simultaneously.

FIG. 10 is a vertical transverse sectional view through the apparatus of FIG. 9.

FIG. 11 is a transverse sectional view taken on the lines 11—11 in FIG. 8.

Figure 1:
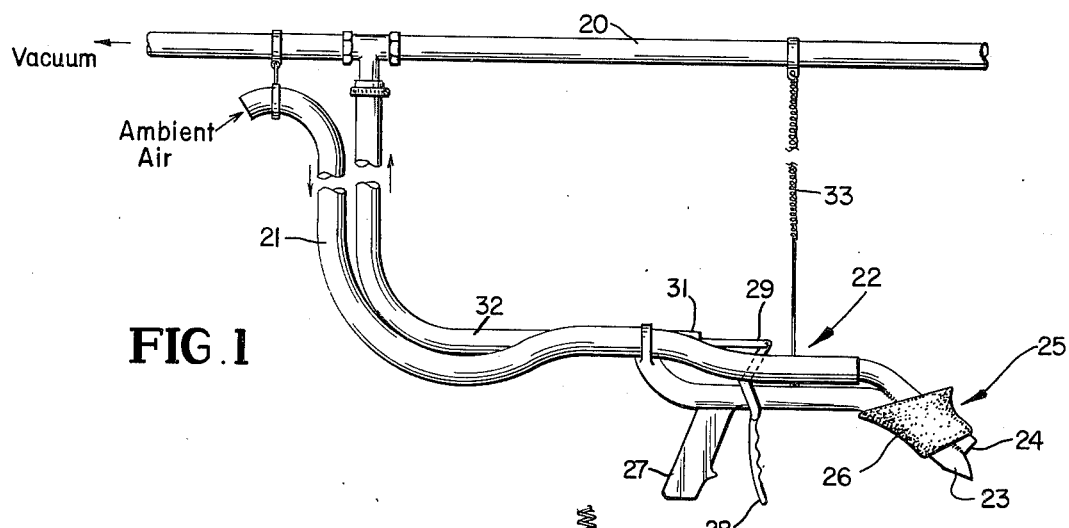
FIG. 1 is a side elevational view of the apparatus for practicing the method of the present invention showing a vacuum source and an ambient air intake at a point remote from the apparatus.

Referring now to the drawings and for the moment to FIG. 1, 20 designates a vacuum line run through a plant for eviscerating and lung removal from fowl such as chickens, turkeys, geese, ducks and the like; 21 designates an ambient air line connected at one end to an eviscerating gun 22 and having its other end vented to atmosphere outside the building or chamber where eviscerating and lung removal takes place. The muzzle of the gun 22 has two barrels in over/under relationship, 23 being the vacuum barrel and 24 being the ambient air barrel; 25 designates the sealing means in the form of a truncated cone-like member 26 in an air tight fit over the muzzle of barrels 23,24.

Figure 4:
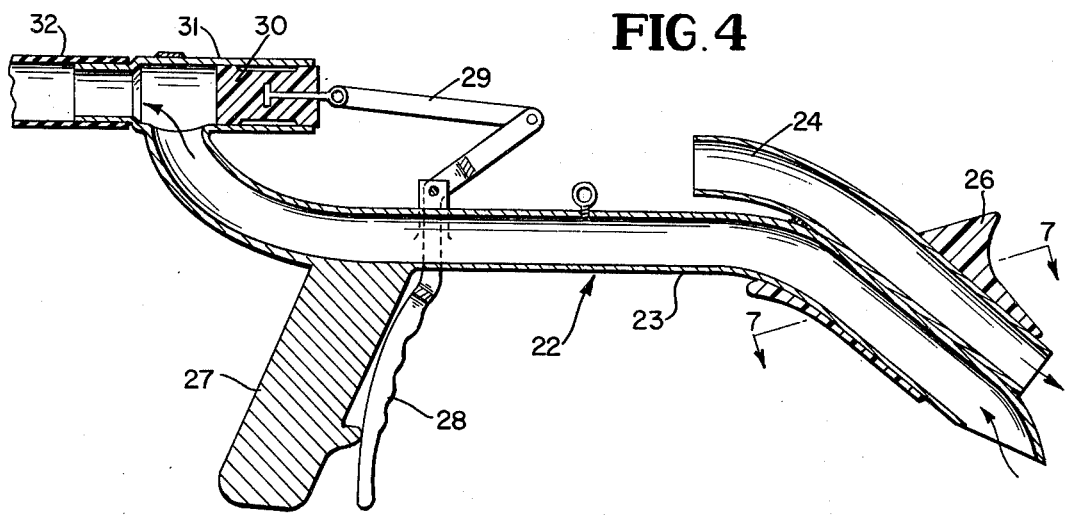
FIG. 4 is a longitudinal sectional view taken through the apparatus of FIG. 2 taken at an enlarged scale.
Figure 5:
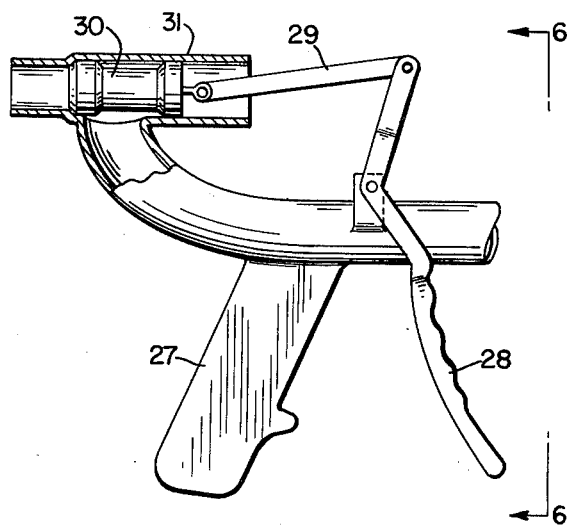
FIG. 5 is a side elevational view of the trigger actuated mechanism in the off or non-operating position.
Figure 6:
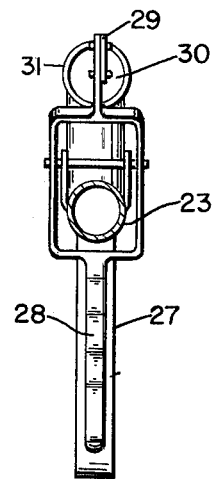
FIG. 6 is a vertical transverse sectional view taken on the lines 6—6 in FIG. 5.
Figure 7:
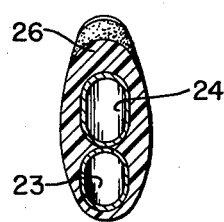
FIG. 7 is a transverse section taken on the lines 7—7 in FIG. 4.

Located proximate the rear of the gun 22 is a pistol grip or handle 27 having a trigger 28 pivoted to a boss and linkage 29 to actuate a valve piston 30 in a valve body 31 connected to a vacuum line 32 in communication with the plant vacuum line 20. FIGS. 4 and 5 show the two positions of the valve body 31 and trigger 28 for actuating the same. The only valve actuated by the trigger 28 is in the vacuum line.

The gun 22 may be suspended from the vacuum line 20 by a spring 33.

The truncated cone-like member 26 is so shaped as to intercept the margin of the posterior opening 34 of the fowl 35 uniformly as it is inserted to expand the margin of the opening sufficiently to ensure an adequate seal between the member 26 and the opening to the body cavity 36 in such a manner as to prevent flow of air between the barrel muzzle of the gun 22 and the member 26 or out of the body cavity 36 of the fowl 35. The rate of increase in the surface perimeter of the member 26 is such that it permits intrusion of the suction device to the appropriate depth to reach and extract the tissue to be removed while maintaining the air seal. The rate of increase in the surface perimeter of the member 26 while maintaining an adequate air seal permits insertion of the gun muzzle to the appropriate depth to accommodate a wide variety of body cavity sizes and depths.

Figure 2:
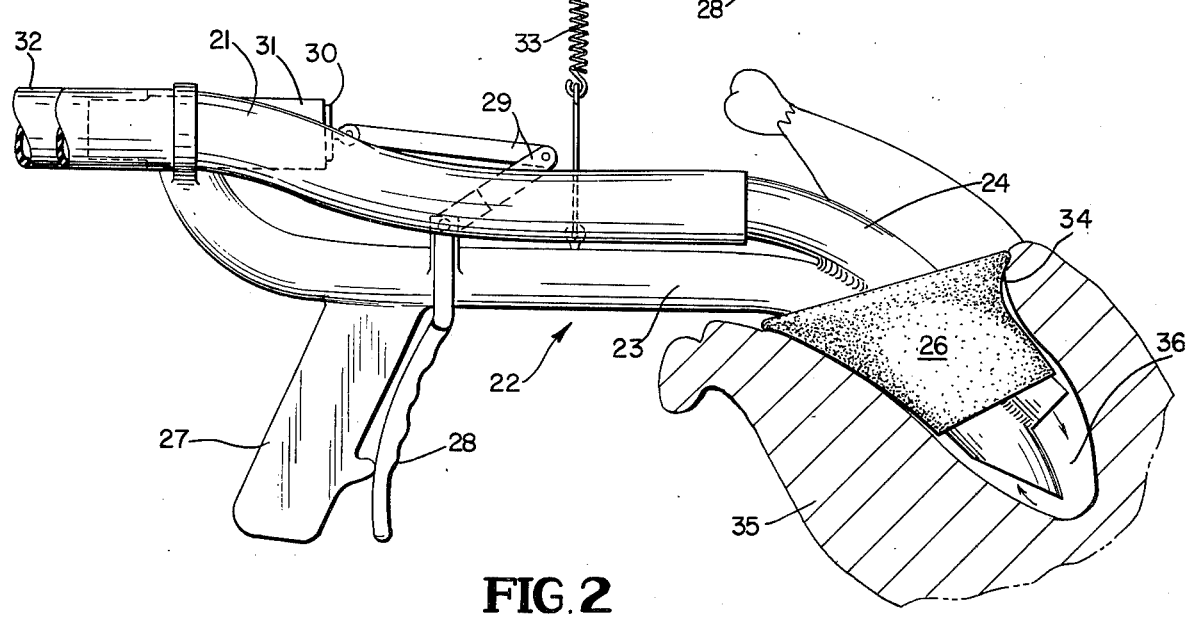
FIG. 2 is a side elevational view of the apparatus of the present invention introduced into the posterior vent opening of a fowl.
Figure 3:
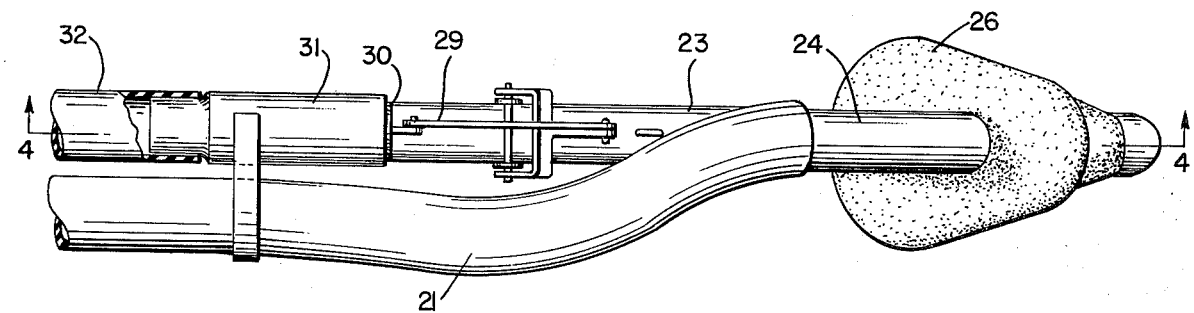
FIG. 3 is a top plan view of the apparatus of FIG. 2.

With the gun inserted into a fowl, as shown in FIGS. 2 and 8, with the valve piston 30 shifted to the open position, left hand end of FIG. 4, the reduced pressure in the body cavity 36 causes the perimeter of the posterior opening to adhere tightly to the surface of the member 26 thereby ensuring a more complete and effective air and noise seal.

The ambient air line 21 provides an alternate method for the air flow necessary to replace the air removed from the body cavity by the vacuum line 32. The ambient air barrel 24 has the same inside diameter as the vacuum barrel 23 for the purpose of replacing body cavity air at approximately the same rate at which it is removed by the vacuum barrel 23. The ambient barrel hose is of sufficient wall thickness to prevent escape of acoustical energy resulting from the air flow inside the hose and that emanating from the body of the fowl. The ambient air replacement at atmospheric pressure is such that the replacement created therein rather than being injected under positive pressure. The path of air flow within the body cavity 36 is as shown by the arrows in FIGS. 2 and 8, namely out at the bottom and in at the top.

The viscera, lungs or trachea are sucked through the vacuum barrel 23 and out the vacuum line 20.

Referring now to FIGS. 9 through 11, a similar gun is shown having two side by side barrels 23A with control valves for sucking out both lungs simultaneously. In the single barrel version of FIGS. 1 through 8 this is accomplished by rocking the over and under barrel construction from left to right or vice versa.

A modified lung gun incorporating the principles of this invention was tried in an operating chicken processing plant in April and July of 1976. The noise levels of the modified gun are compared with the unmodified gun at the same time and at the same location. The differences between the two trial dates are the result of lower background noise effected by other noise reduction efforts in the plant between the two trial dates.

Noise levels of gun in use on chicken processing line (dB A-weighted, at ear level of operator)

|  | April 1976 | July 1976 |
|---|---|---|
| Unmodified gun | 108 | 103 |
| Modified gun with seal | 92 | 88 |

The construction of the gun 22 may be made of any suitable material or combinations of materials such as suitable plastics and/or metals, one combination could be stainless steel tubing for the vacuum barrel 23 and the ambient barrel 24 while the sealing means or truncated cone-like member 26 is made from teflon (polytetrafloroethylene) because of its very low co-efficient of friction for insertion and withdrawal from the body cavity of the fowl.

What I claim is:

1. The method of reducing the noise level surrounding the work area where lungs and/or trachea are removed by vacuum from a previously eviscerated fowl having a vent end opening comprising:
    a. subjecting the fowl evisceral cavity to a vacuum while simultaneously providing for replacement air to flow into the cavity to both replace the air moved by the vacuum and to fill the void left by suction removal of the lungs and trachea, and
    b. maintaining a seal, between the vacuum and replacement air introducing instrumentality, and the perimeter of the vent opening in the carcass of the fowl to retain the noise of high velocity turbulent air flow within the cavity within the eviscerated carcass.

2. The method of claim 1 wherein the source of replacement air is ambient air at atmospheric pressure to ensure an adequate volume of replacement air flow while ensuring that noise generated by ambient air flow does not reach the work area.

3. An apparatus for reducing the noise level surrounding the work area where lungs and/or trachea are removed from a previously eviscerated fowl having a resonant cavity and a vent end opening connectable to a vacuum source and an ambient air source;
    a. a first means introducable through the vent opening of the fowl into the resonant cavity and connectable to the vacuum source,
    b. a second means positioned proximate said first means and being introducable therewith through the vent opening of the fowl into the resonant cavity and connectable to the ambient air source, and
    c. sealing means secured to said first and second means proximate their ends introducable through the vent into the resonant cavity and having a surface perimeter of variable length to effect a seal between said sealing means and the vent opening to retain the noise of high velocity turbulent air flow within the resonant cavity within the eviscerated carcass.

4. An apparatus as claimed in claim 3 wherein said first and second means are barrels connected one over the other and together.

5. An apparatus as claimed in claim 4 wherein said sealing means comprises a truncated cone-like member over said barrels in an airtight seal relationship therewith on its inside and having an outer perimeter longest at its upper end and reducing in cross-section toward the muzzle of the barrels to conform in an air seal relationship between the size of the posterior opening in the fowl and the depth to which the vacuum muzzle must penetrate.

6. An apparatus as claimed in claim 5 wherein said second means is a pair of side by side barrels for removal of both lungs of a fowl simultaneously.

7. For use with a vacuum line in communication with a source of vacuum and an ambient atmospheric air line; an eviscerating and lung removal gun for use on previously eviscerated fowl having a posterior opening and cavity comprising:
    a. a vacuum barrel,
    b. an atmospheric ambient air barrel,
    c. said barrels being in over and under relationship,
    d. a truncated cone-like member over said barrels in airtight relationship therewith proximate the muzzle of said barrels,
    e. the outer surface of said truncated cone-like member having an outer surface perimeter longest at its upper end and reducing in cross-section toward the muzzle of said barrels,
    f. and operator activated valve means in fluid circuit with said vacuum barrel to selectively place said vacuum barrel in communication with the vacuum source when said truncated cone-like member is inserted into the posterior opening of the fowl for suction removal of the lungs and/or trachea from the fowl.

8. A gun as claimed in claim 7 wherein there are a pair of vacuum barrels in side by side relationship for simultaneous removal of both lungs.

* * * * *